United States Patent Office

3,446,562
Patented May 27, 1969

---

3,446,562
APPARATUS FOR PHOTOMETRIC ANALYSIS
Torbjörn Oskar Caspersson and Gösta Mattias Lomakka, both of Karolinska Institutet, Stockholm 60, Sweden
Filed May 7, 1965, Ser. No. 453,930
Claims priority, application Sweden, May 21, 1964, 6,187/64
Int. Cl. G01j 1/44
U.S. Cl. 356—222     3 Claims

---

ABSTRACT OF THE DISCLOSURE

A photometric analysis of an object is carried out by means of a scanning and integrating apparatus which comprises a phototube, a specimen holder, means for producing a relative movement between the phototube and the specimen holder in accordance with the desired scanning course, and an integrator for integrating the electrical output from the phototube. The apparatus contains a cathode ray tube and means for transferring the relative movement between the phototube and the specimen holder to a light spot on the screen of the cathode ray tube. An auxiliary phototube is arranged to receive the light from the light spot. A diaphragm is provided between the screen of the cathode ray tube and the auxiliary phototube which defines the desired measuring field, because light from the light spot can reach the auxiliary phototube only when passing through the opening of the diaphragm. An electronic gate is arranged to be actuated by the auxiliary phototube to cut off the electrical output from the phototube to the integrator when the auxiliary phototube does not receive any light from the screen of the cathode ray tube.

---

The invention relates to an apparatus for limiting the measuring field in a scanning and integrating apparatus for the photometric analysis of a specimen. The invention is particularly concerned with microphotometers and microinterferometers for analyzing very small specimens, but is also useful in apparatuses for a photometric analysis of larger specimens, for instance photographic plates.

Method of the invention is characterized in transferring the scanning movement to a light spot on the screen of a cathode ray tube, observing said light spot by means of an auxiliary phototube, placing a diaphragm between the screen of the cathode ray tube and the auxiliary phototube, said diaphragm delimiting on the scanning area a measuring field of such a size as to cover only the desired specimen, the electrical output from the auxiliary phototube being used for starting and stopping the photometric analysis.

The apparatus of the invention comprises a phototube, a specimen holder, means for producing a relative movement between the phototube and the specimen holder in accordance with the desired scanning course, and an integrator for integrating the electrical output from the phototube, and is characterized by a cathode ray tube, means for transferring the relative movement between the phototube and the specimen holder to a light spot on the screen of the cathode ray tube, an auxiliary phototube for observing said light spot, a diaphragm between the screen of the cathode ray tube and the auxiliary phototube for defining the desired measuring field, and an electronic gate which is actuated by the auxiliary phototube to cut off the output from the phototube to the integrator when the auxiliary phototube does not receive any light from the screen of the cathode ray tube.

Figure 1:
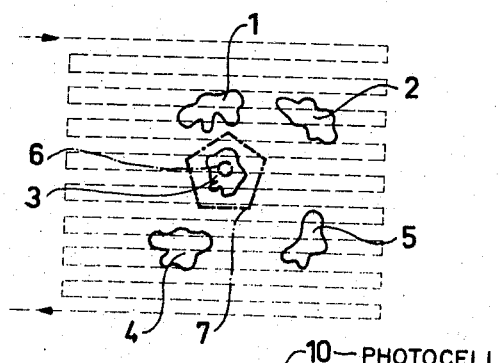
Figure 2:
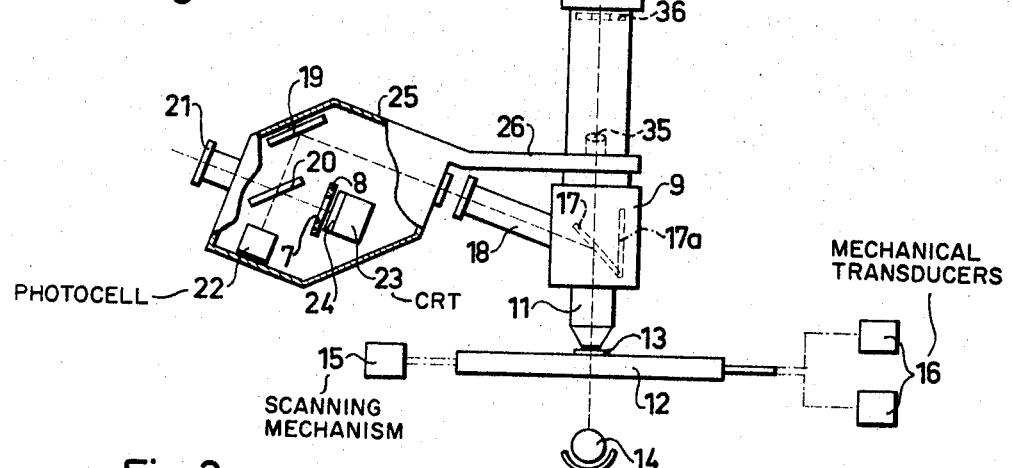
Figure 3:
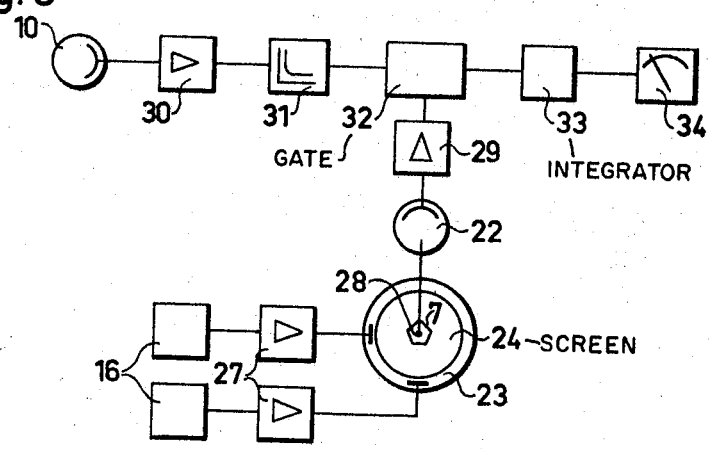

The invention will be described below with reference to the accompanying drawing which illustrates how the invention can be used in a microphotometer. FIG. 1 shows a specimen to be analyzed, a diaphragm for the delimitation of the specimen, and the scanning course as followed in the photometric analysis. FIG. 2 shows a microphotometer having an apparatus according to the invention. FIG. 3 shows the electric circuit of the apparatus disclosed in FIG. 2.

FIG. 1 shows a magnified image of a specimen consisting of five cells 1–5 from a human tissue, for instance. It is desired to analyze cell No. 3 to find out the quantity of light-absorbing substance in said cell. This is done by passing a light beam through the cell and analyzing the absorption of the light beam in the cell, the degree of absorption representing the quantity of light-absorbing substance. If, for instance, the light is monochromatic and has a wave length of 2650 Angstrom units the absorption represents the quantity of nucleic acids in the cell. It is preferred, for the sake of convenience, to measure the transmission in lieu of the absorption. The transmission T is:

$$T = 10^{-\text{k.c.d.}}$$

wherein c.d. is the quantity of light-absorbing substance per unit of area. Consequently, the transmission is an exponential function of the quantity of light-absorbing substance. The light-absorbing substance is not evenly distributed in the cell. Therefore, it is not possible to measure the transmission in one single measurement by means of a light beam covering the whole cell. It is necessary to measure on a small area in which the light-absorbing susbtance is likely to be evenly distributed, and to move said measuring area so as to cover the entire area of the cell, and to integrate the results of said measurements over the entire cell area. FIG. 1 illustrates such a small measuring area 6. In the analysis of cells it has been found that the measuring area should preferably have a diameter of approximately 1 micron. This measuring area 6 is moved in a scanning course as indicated by the dotted line.

FIG. 1 also illustrates the contour 7 of the desired measuring field. The measuring field delimits the cell 3 from the other cells in the scanning area. It is desired that measuring shall take place only when the measuring area 6 is within the contour 7. How this is done will be explained with reference to FIGS. 2 and 3.

The apparatus disclosed in FIG. 2 comprises a microscope 9 having below its objective 11 a holder 12 for a specimen 13. A light source 14 sends a light beam through the specimen 13 and the objective 11 to a phototube 10 which measures the intensity of the lightbeam. The specimen holder 12 can be moved in two directions, perpendicular to each other, by means of a scanning mechanism 15 so as to move in the scanning course illustrated with dotted lines in FIG. 1 said scanning mechanism may be of a type well known in the art, for instance the scanning mechanism belonging to the well-known microspectrophotometer named Zeiss UMSP I. Two electromechanical transducers 16 are connected to the specimen holder 12. One transducer is arranged so as to respond to the movements in one direction of the specimen holder, and the other transducer is arranged so as to respond to the movements of the specimen holder in the other direction. Both transducers produce electrical outputs which will be described with reference to FIG. 3. Said transducers may be of any well-known type adapted to transform a mechanical movement into electrical output pulses, for instance differential transformers.

The apparatus further contains a lens 35 which imparts a further magnification to the magnified image produced by the objective. The apparatus further contains a diaphragm 36, situated below the phototube 10 so as to define the size of the measuring area. If the desired measuring area, has a diameter of 1 micron, and if the total magnification is 5000, the aperture of the diaphragm 36 shall have a diameter of 5 millimeters.

The microscope further contains a mirror which can be moved between two positions 17 and 17a. The light reflected in the mirror in position 17 passes through an eyepiece 18, is reflected in a mirror 19, passes through a semitransparent mirror 20 and is received by an auxiliary phototube 22. The light reflected in the semitransparent mirror 20 passes through an eyepiece 21. The screen 24 of a cathode ray tube 23 is placed in the optical axis of said eyepiece 21. Close to said screen 24 there is provided a diaphragm 8, the aperture 7 of which has a contour in accordance with the contour 7 of the desired measuring field. The parts 19–24 are mounted in a housing 25 which is rotatably secured to the microscope 9 by means of an arm 26. When desired, the housing 25 can be turned away from the eyepiece 18. The diaphragm 8 may be provided with an adjustable aperture, or it may be mounted so as to be readily changed, so that for each particular analysis the desired aperture may be chosen.

FIG. 3 illustrates the electrical circuit. As mentioned above, the transducers 16 produce electrical output pulses corresponding to the movements of the specimen holder 12. These output pulses are amplified in amplifiers 27 and are transmitted, in a manner known per se, to the cathode ray tube 23, thus imparting to the light spot 28 on the screen 24 a movement corresponding to the scanning course shown in FIG. 1. The light from the light spot 28 is transmitted (via the semitransparent mirror 20 in FIG. 2) to the auxiliary phototube 22. The electrical output from this phototube is transmitted via an amplifier 29 to an electronic gate 32. The electrical output from the phototube 10 is transmitted via an amplifier 30 to a logarithmic amplifier 31 in which it is transformed logarithmically in a manner known per se, to make the intensity directly proportional to the quantity of light-absorbing substance within the measuring area 6. After having been thus transformed logarithmically the electrical output is transmitted, via the gate 32 referred to above, to an integrator 33 in which the output is integrated over the whole specimen surface, in a manner known per se. A recorder represented by measuring instrument 34 indicates the result, which represents the total quantity of light-absorbing substance in the specimen.

The specimen 13, the screen 24 and the aperture 7 are visible simultaneously in the eyepiece 21 when the mirror is in position 17. This fact makes it possible to place the diaphragm 8 and the specimen 13 in their desired positions before the measuring process. The specimen 13 is readily adjusted so that only the desired portion, that is the cell 3, lies within the aperture 7. This adjustment having been made the mirror 17 is moved into position 17a and the apparatus is ready for use. During the measuring process the light spot 28 on the screen of the cathode ray tube moves synchronously with the measuring area 6. When the measuring area 6 reaches the contour 7, that is leaves the desired measuring field, the diaphragm 8 cuts off the light beam from the light spot 28 to the auxiliary phototube 22. The gate 32 is actuated by said auxiliary phototube 22 to switch off the connection between the phototube 10 and the integrator 33. When the measuring area 6 again comes within the desired measuring field light can again pass from the cathode ray tube to the auxiliary phototube 22, and the gate 32 opens the connection between the phototube 10 and the integrator 33.

We claim:
1. A scanning and integrating apparatus for photometric analysis of a specimen comprising, a main phototube, a specimen holder, a light source positioned to send a beam of light through the specimen to said main phototube, means for producing relative movement between said phototube and said specimen holder in accordance with a predetermined scanning course, an integrator for integrating the electrical output from said phototube, a cathode ray tube, means for transforming the relative movement said phototube and specimen holder into a corresponding movement of the light spot on the screen of said cathode ray tube, an auxiliary phototube for observing said light spot, a diaphragm between said screen and said auxiliary phototube for defining the desired measuring field, and an electronic gate actuated by said auxiliary phototube to cut off the electrical output from said main phototube to said integrator when said auxiliary phototube does not receive any light from the screen of said cathode ray tube.

2. An apparatus for the photometric analysis of a small specimen, comprising a microscope, a specimen holder, a light source positioned to send a light beam through said specimen and through said microscope, a main phototube positioned to receive said light beam after its passage through said microscope, an integrator connected to said main phototube for receiving the electrical output from said phototube, a scanning mechanism coupled to said specimen holder for moving said holder in a predetermined scanning course covering a predetermined scanning area, means responsive to the movements of said specimen holder and which produce electrical output signals indicative of the position of said specimen holder, a cathode ray tube to which said output signals indicative of the position of said specimen holder are fed and which produces on the screen thereof a light spot which moves synchronously with said specimen holder, an auxiliary phototube positioned to receive light emitted from said light spot, a diaphragm interposed between the screen of said cathode ray tube and said auxiliary phototube for shielding part of said screen so as to leave an aperture corresponding to the desired measuring field, an electronic gate connected to receive the electrical output from said auxiliary phototube, said gate serving to cut off the connection between said main phototube and said integrator when said diaphragm prevents the light spot from the screen of said cathode ray tube from reaching said auxiliary phototube, and recording means connected to the output from said integrator.

3. An apparatus as defined in claim 2, additionally comprising an eyepiece allowing the operator to view the screen of the cathode ray tube, a semitransparent mirror between said screen and said eyepiece, and means for deflecting the light beam from the microscope to said eyepiece via said semitransparent mirror, for allowing the operator to view the specimen as an image superimposed upon the image of said screen.

References Cited

UNITED STATES PATENTS 2,847,162  8/1958  Meyer.
2,913,584  11/1959  Dill.

JEWELL H. PEDERSEN, Primary Examiner.

O. B. CHEW II, Assistant Examiner.

U.S. Cl. X.R.

258—217; 356—226